Patented Apr. 11, 1950

2,503,919

UNITED STATES PATENT OFFICE 2,503,919

COMPOSITIONS OF MATTER COMPRISING POLYSILOXANEAMINES

Winton I. Patnode, Schenectady, N. Y., assignor to General Electric Company, a corporation of New York No Drawing. Application January 11, 1947, Serial No. 721,671

12 Claims. (Cl. 260—448.2)

This application is a continuation in part of my copending applications Serial No. 543,209, filed July 1, 1944, and Serial No. 632,133 filed November 30, 1945, now abandoned, both of which are assigned to the same assignee as the present invention.

The invention disclosed and claimed in the above-identified parent application Serial No. 543,209 broadly relates to the treatment of solid bodies to render the surfaces thereof water-repellant, and is especially concerned with a water-repellent treatment for ceramic and other vitreous bodies, e. g., glass.

Methods of producing water-repellent materials by treating water-non-repellent bodies, including ceramic bodies, with organo-silicon halides (organohalogenosilanes) in vapor form are described in, for example, my Patent No. 2,306,222, issued December 22, 1942, and assigned to the same assignee as the present invention.

Briefly described, the invention disclosed and claimed in my above-identified parent application Serial No. 543,209 is based on the discovery that the surfaces of solid bodies, particularly the surfaces of ceramic articles, can be conveniently rendered water-repellent by treatment with lower alkyl polysiloxanes containing halogen atoms or other reactive substituents (more specifically radicals or groups) connected to some of the silicon atoms. Examples of polysiloxanes which can be employed in practicing the invention claimed in parent application Serial No. 543,209 are the symmetrical methyl dichlorosiloxanes and other lower-alkylhalogenosiloxanes described in my application Serial No. 463,812, filed October 29, 1942, now Patent No. 2,381,366, issued August 7, 1945, and assigned to the same assignee as the present invention, more particularly organosilicon compounds having the formula $X(SiR_2O)_n$ wherein X represents a halogen atom, R represents a monovalent lower alkyl group, and $n$ is a whole number and is equal to at least 1, e. g., tetramethyl-1,2-dichlorodisiloxane, hexamethyl1,3-dichlorotrisiloxane, octamethyl-1,4-dichlorotetrasiloxane, etc.

Examples of other polysiloxanes that can be employed in carrying into effect the invention claimed in the aforementioned parent application are the corresponding esters, borates and amines of the siloxane derivatives claimed in my aforementioned Patent No. 2,381,366, which compounds may be prepared by, for example, reacting these and other halogenosiloxanes to be described more fully hereinafter with suitable aliphatic alcohols, boric acid or ammonia. The invention claimed in the present application is concerned particularly with compositions comprising the amine derivatives, and more specifically with compositions comprising the Si-containing (i. e., silicon-containing) material or complex obtained by effecting reaction between ammonia and a lower-alkylhalogenopolysiloxane substance containing an average of from about 0.16 to 1.0 halogen atom per silicon atom.

Glass and other vitreous and ceramic materials that have been treated in accordance with the invention disclosed and claimed in the above-identified parent application have been found to have water-repellent surfaces which are superior to those obtained by the use of organosilicon halides both in durability and effectiveness. The compounds employed in practicing that invention are easier to handle and apply than are the organo-silicon halides, since they contain smaller proportions of halogen, if any. Hence they are more stable and give off less hydrogen halide, if any, when applied to the surfaces to be treated, and they appear to produce a more effective surface. By substituting other hydrolyzable groups for all or part of the halogen atoms in the halogenopolysiloxanes, products are obtained which are particularly adapted for use on, or in the neighborhood of, surfaces attacked by hydrogen halides.

Although the invention claimed in my parent copending application Serial No. 543,209 is applicable to the treatment of a number of inorganic materials, it is particularly adapted to the treatment of glass products where optical clarity of the treated glass is of prime importance. Since the treatment can be applied without the use of any special apparatus, it is ideally suited as an anti-rain treatment for windshields and windows in automobiles, ships, swiftly moving vehicles such as aircraft, etc. A small quantity of the treating compound or a solution thereof in an inert solvent such as toluene, gasoline, ethers, etc., is applied to the surface of the glass and the excess material is rubbed off with a clean cloth. There is no visible film on the threaded surface. Windows and windchields so treated permit better visibility in a rainstorm than do the untreated windows and windshields. Under some icing or frosting conditions the treatment definitely retards loss of visibility due to the formation of ice or frost, and any ice or frost which does collect is more easily removed from treated surfaces, by wiping or by heat, than from untreated surfaces.

There is apparently a chemical reaction between the treating material and the vitreous surface, since the treated surfaces can be washed with soap and water, or with alcohol, acetone, benzene, etc., or rubbed with a cloth without losing their water-repellent or anti-rain properties. This treatment not only increases the contact angle between water and glass, but also increases the ease with which the drops slide off the glass. The treating compounds in themselves function as cleaning fluids for the glass surfaces. If desired, various inert cleaning solvents or mild abrasives such as talc, chalk or infusorial earth may be added to the compounds to improve this cleaning action. Household glassware and dishes benefit from treatment with the hereindescribed treating compounds in that they are more easily kept clean and are much easier to dry after washing. The treatment also retards the formation of the opaque film which sometimes appears on glass, thus maintaining the original sparkling appearance.

The substituted lower alkyl polysiloxanes found to be suitable for practicing the invention claimed in my above-identified parent copending application include the pure or mixed methyl, ethyl and propyl polysiloxanes containing at least one, preferably approximately two, hydrolyzable atoms or groups connected to silicon atoms. The hydrolyzable substituents may be halogens, particularly chlorine or bromine atoms, or lower alkoxy radicals, amino radicals or borate radicals. For maximum water-repellency and ease of application, I prefer to employ the polyalkylchloropolysiloxanes, particularly the straight-chain, halogenated polysiloxanes or mixtures of such polysiloxanes having the general formula $$X(SiR_2O)_nSiR_2X$$

where X represents a halogen atom, specifically a chlorine atom, R represents a monovalent lower alkyl group, particularly a methyl group, and $n$ is an integer equal to at least 1, preferably from 3 to about 7. Such polysiloxanes contain an average of from about 0.25 to 1, preferably 0.3 to 0.5, halogen atom per silicon atom. In other words, an average of from about 0.25 to 1, preferably 0.3 to 0.5, of the silicon atoms are each connected to a halogen atom. Other suitable halogenopolysiloxanes include the halogenated branched-chain polysiloxanes and halogenated polysiloxanes containing terminal R₃Si— groups. Such compounds can be prepared, for example, by partial hydrolysis of dialkyldihalogenosilanes such as dimethyldichlorosilane containing up to approximately 10 per cent by weight of a trialkylhalogenosilane, such as trimethylchlorosilane, or an alkyltrihalogenosilane such as methyltrichlorosilane, or both, to the point where the principal products are lower alkyl polysiloxanes containing one or more halogen atoms per moleclue. Halogenopolysiloxanes or mixtures thereof especially suitable for use in practicing the invention claimed in parent application Serial No. 543,209 contain from 2 to 8 silicon atoms, have an average R/Si ratio of from about 1.8 to 2.5 and an average Hal/Si (halogen/silicon) ratio of from 0.16 to 1, preferably 0.3 to 0.5, the remaining valences of the silicon atoms being taken up by oxygen.

When the treatment is to be applied to, or in the neighborhood of, unprotected metal surfaces which are readily corroded by hydrogen halides, it may be found desirable to employ polysiloxanes of the above type in which all or part (i. e., at least some) of the halogens attached to silicon have been replaced by the less corrosive amino, lower alkoxy or borate radicals. The esters usually should contain some halogen attached to silicon or a small quantity of a hydrogen halide, or should be applied as mixtures with the halogenopolysiloxanes to increase the chemical reactivity of the esters.

Suitable polysiloxaneamines or Si-amine polysiloxanes, more particularly reaction products of ammonia and lower-alkylhalogenopolysiloxane substance containing an average of from about 0.16 to 1.0 halogen atom per silicon atom such as are claimed in the present application, can be prepared by treating halogenopolysiloxanes containing the desired Hal/Si ratio with sufficient anhydrous ammonia to replace the desired number of halogen atoms with amino groups.

The reaction between the halogenopolysiloxane or halogenopolysilane mixture and ammonia is a progressive one, the initial reaction products comprising a mixture of polysiloxanes containing both silicon-bonded halogen and silicon-bonded amino groups. As more ammonia is introduced into the reaction mixture additional halogen atoms are replaced by amino radicals. Since the reactions involve only the silicon-bonded halogen atoms of the polysiloxanes and are independent of the nature of the silicon-bonded hydrocarbon radicals, the following specific example is believed sufficient to illustrate the manner whereby the compositions of the present invention can be obtained.

*Example*

138 g. of a halogenopolysiloxane represented by the formula

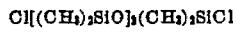

and which may be named hexamethyl-1,3-dichlorotrisiloxane, was dissolved in 600 cc. of anhydrous ethyl ether and anhydrous ammonia bubbled through the solution for 4 hours. The precipitated ammonium chloride was filtered off and washed with 400 cc. of anhydrous ether. The ether was stripped from the combined washings and filtrate. The resulting liquid mixture of Si-amines was very effective for rendering vitreous surfaces water-repellent. The treated surfaces could be rubbed with soap and water, alcohol, acetone and benzene without losing their water-repellent properties.

The compounds resulting from the reaction of ammonia on the halogenated polysiloxanes are believed to include aminopolysiloxanes formed by ammonolysis of the halogenopolysiloxanes in accordance with the following abbreviated equation:

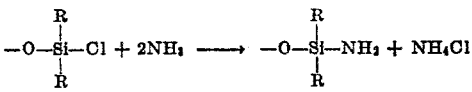

and, also, condensation products of the aminopolysiloxanes containing silazine (—Si—NH—Si—) linkages as well as siloxane (—Si—O—Si—) linkages. These compounds are designated herein and in the claims generally "polysiloxaneamines," which term is intended to cover all of the compounds of the invention covered by the present application, all of which are characterized by a —Si—O—Si—NH— grouping wherein the remaining nitrogen bond is connected either to a second hydrogen atom or to the silicon atom of a siloxane radical.

The condensation products of the aminopolysiloxanes containing silazine (—Si—NH—Si—) linkages as well as siloxane (Si—O—Si) linkages which may be present in the polysiloxaneamine mixtures, result, for example, from the reaction of an aminopolysiloxane radical with a chlorosiloxane radical,

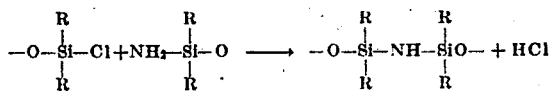

with the hydrogen chloride by-product then being neutralized by one molecule of ammonia to form ammonium chloride.

When the total quantity of ammonia is insufficient to replace all of the chlorine atoms, the products will, of course, contain a mixture of polysiloxanes containing —Si—NH$_2$,

as well as —Si—Cl groups and linkages. Such products also come within the scope of the present invention and the term "polysiloxaneamine" as used herein and in the appended claims is also intended to include those compounds containing residual chlorine or other halogen atoms in addition to the silazine or silylamine groups or both.

It will thus be apparent that the products of reaction of the ammonia and the halogenopolysiloxanes described hereinbefore will contain one or more polysiloxaneamines such as the aminopolysiloxanes, of the formula

and the silazine derivatives wherein two or more of the polysiloxane groups —(SiR$_2$O)$_n$SiR$_2$— are connected by silazine linkages to form either linear compounds such as

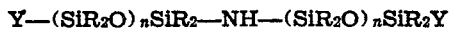

where Y represents an R group, a halogen atom, an amino radical or another silazine linkage, depending on the starting materials and extent to which the ammonolysis reaction has been carried, or cyclic compounds such as the compound

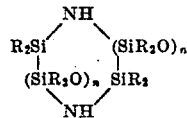

From the foregoing description it will be seen that the present invention provides new and useful compositions of matter comprising liquid mixtures of polysiloxaneamines further characterized by the fact that all or part, preferably at least a major portion of the silicon-bonded halogen atoms of a lower alkyl (e. g. methyl) halogenopolysiloxane containing from about 0.16 to 1.0 halogen atoms per silicon atom have been replaced by amino nitrogen radicals. Since the halogenopolysiloxanes used in preparing the polysiloxaneamines contain an average of from about 0.16 to 1 —Si—X linkages (where X represents a halogen atom), the polysiloxaneamine products will contain the same proportion of Si—NH— linkages or Si—NH— plus Si—X linkages. In other words, since each silicon atom has four valences, from 4 to 25 percent of the silicon bonds in the polysiloxaneamine products will be connected to a radical or group selected from the class consisting of halogen and (—NH—) radicals, at least a major portion of said silicon bonds being connected to —NH— radicals in which the remaining nitrogen bond is satisfied either by a hydrogen atom or a siloxane radical, where the nitrogen bond is attached directly to the silicon atom.

The treating agents hereinbefore described are applicable not only to the treatment of glass surfaces to render such surfaces water-repellent, but also to all types of ceramic articles and surfaces of a siliceous character, including glazed or enamelled articles, porcelain, quartz, glass fiber, etc. Metals such as stainless steel, nickel, phosphor bronze and aluminum are examples of other inorganic materials, the surfaces of which can be rendered water-repellent by treatment with the polysiloxane derivatives described herein.

What I claim as new and desire to secure by Letters Patent of the United States, is:

1. A composition of matter consisting essentially of a mixture of alkyl polysiloxaneamines and comprising the product of reaction between (1) anhydrous ammonia and (2) an alkylchloropolysiloxane containing terminal silicon-bonded chlorine atoms.

2. A composition of matter consisting essentially of a mixture of lower alkyl polysiloxaneamines containing an average of from 1.8 to 2.5 alkyl radicals per silicon atom and comprising the product of reaction between (1) anhydrous ammonia and (2) a lower alkylchloropolysiloxane containing terminal silicon-bonded chlorine atoms.

3. A composition of matter consisting essentially of a mixture of alkyl polysiloxaneamines containing an average of from 1.8 to 2.5 alkyl radicals per silicon atom and having terminal Si—Cl groups, said composition of matter comprising the product of reaction between (1) anhydrous ammonia and (2) an alkylchloropolysiloxane containing terminal silicon-bonded chlorine atoms.

4. A composition of matter consisting essentially of a mixture of lower alkyl polysiloxaneamines containing a plurality of polysiloxane groups linked by —NH— radicals, the free valences of the —NH— radical being connected directly to silicon atoms, the said composition of matter comprising the product of reaction between (1) anhydrous ammonia and (2) an alkylchloropolysiloxane containing terminal silicon-bonded chlorine atoms.

5. A composition of matter consisting essentially of a mixture of lower alkyl polysiloxaneamines in which an average of from 4 to 25 per cent of the silicon bonds are connected to a halogen atom, said composition comprising the product of reaction between (1) anhydrous ammonia and (2) a lower alkylchloropolysiloxane containing from 0.16 to 1.0 terminal silicon-bonded chlorine atom per silicon atom.

6. A composition of matter consisting essentially of a mixture of methylpolysiloxaneamines in which an average of from 4 to 25 per cent of the silicon bonds are connected to —NH— radicals, the free valences of the —NH— radical being connected to silicon atoms, said composition comprising the product of reaction between (1) anhydrous ammonia and (2) a methylchloropolysiloxane containing from 0.16 to 1.0 terminal silicon-bonded chlorine atom per silicon atom.

7. A product consisting essentially of a mixture of polysiloxaneamines including polysiloxane groups of the general formula

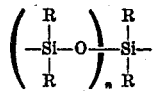

where R represents a monovalent lower alkyl group, and $n$ is an integer equal to from 1 to 7, at least half of the free silicon bonds being connected to —NH— radicals and the remaining free silicon bonds being connected to a chlorine atom, the free valences of the —NH— radicals being connected to silicon atoms, the said mixture comprising the product of reaction between (1) anhydrous ammonia and (2) a lower alkylchloropolysiloxane containing a terminal silicon-bonded chlorine atom.

8. A product consisting essentially of a mixture of polysiloxaneamines including polysiloxane groups of the general formula

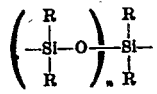

where R represents a monovalent lower alkyl group and $n$ is an integer equal to from 1 to 7, all the free silicon bonds being connected to —NH— radicals and all the valence bonds of the —NH— radical being connected to silicon atoms, the said mixture comprising the product of reaction between (1) anhydrous ammonia and (2) a lower alkylchloropolysiloxane in which the chlorine atoms are terminal silicon-bonded chlorine atoms.

9. The method of preparing a polysiloxaneamine which comprises effecting reaction between anhydrous ammonia and a lower alkylchloropolysiloxane substance containing an average of from about 0.16 to 1.0 terminal silicon-bonded chlorine atom per silicon atom.

10. The method of preparing a new Si-containing composition of matter, said method comprising effecting a reaction between anhydrous ammonia and hexamethyl-1,3-dichlorotrisiloxane, and isolating the resulting Si-containing material from the reaction mass.

11. The isolated product of reaction as prepared in claim 10.

12. A composition of matter consisting essentially of the isolated product of reaction between (1) anhydrous ammonia and (2) a linear methylchloropolysiloxane containing a terminal silicon-bonded chlorine, the said polysiloxane containing from 0.16 to 1.0 terminal silicon-bonded chlorine atom per silicon atom.

WINTON I. PATNODE.

REFERENCES CITED

The following references are of record in the file of this patent:

UNITED STATES PATENTS

| Number | Name | Date |
|---|---|---|
| 2,306,222 | Patnode | Dec. 22, 1942 |
| 2,406,971 | Sowa | Sept. 3, 1946 |
| 2,421,653 | Sauer | June 3, 1947 |

OTHER REFERENCES

Reynolds, Jour. Amer. Chem. Soc., vol. 51 (1929), pages 3067–3072.

Burkhard et al., "Chemical Reviews," vol. 41 (1947), pages 118–120.